United States Patent [19]
Perez et al.

[11] Patent Number: 6,064,886
[45] Date of Patent: May 16, 2000

[54] METHOD AND APPARATUS FOR ROUTING SUBSCRIBER ORIGINATED CALLS IN A FIXED WIRELESS ACCESS SYSTEM

[75] Inventors: Louis Perez, Richardson; Marcos Harms; Balaji Srinivas Holur, both of Plano; Ramanathan Balachander, Dallas, all of Tex.

[73] Assignee: Nortel Networks Corporation, Richardson, Tex.

[21] Appl. No.: 08/942,231

[22] Filed: Oct. 1, 1997

[51] Int. Cl.$^7$ ................................................ H04M 11/00
[52] U.S. Cl. ............................................ 455/443; 455/554
[58] Field of Search .................................... 455/432, 433, 455/434, 435, 436, 462, 463, 518, 519; 435/442, 443, 465, 554, 555

[56] References Cited

U.S. PATENT DOCUMENTS

| | | | |
|---|---|---|---|
| 4,876,738 | 10/1989 | Selby | 455/432 |
| 5,210,787 | 5/1993 | Hayes et al. | 455/432 |
| 5,438,608 | 8/1995 | Kojima | 455/463 |
| 5,694,393 | 12/1997 | Kaye | 455/518 |
| 5,722,044 | 2/1998 | Padovani et al. | 455/443 |
| 5,884,142 | 3/1999 | Wiedeman et al. | 455/443 |

*Primary Examiner*—Paul Loomis
*Attorney, Agent, or Firm*—Paul W. Fulbright

[57] ABSTRACT

A fixed wireless access system includes circuitry for routing a call for a subscriber having a directory number not only through the primary cell, but also through any secondary cell for a border cell subscriber. In each case, the primary and secondary cells borders a geographically located near the geographic location of the border cell subscriber. For calls that are being routed to the border cell subscriber, one of a plurality of subscriber features including call forward no-answer, call forward unconditional or multiple access directory numbers may be used to cause the switch to trigger one or more fixed wireless access controllers to generate page request signals to the base stations for the border cell subscriber. For calls originated by the border cell subscriber, the subscriber's directory number is placed within the subscriber list for each base station whose cell borders are located geographically near the border cell subscribers geographic location. Accordingly, if the border cell subscriber unit locks onto a base station of a secondary border cell, the controller recognizes the subscriber unit and may process the call.

2 Claims, 5 Drawing Sheets

| Directory Number | Circuit I.D 1 | Circuit I.D 2 | Circuit I.D 3 |
|---|---|---|---|
| A | xxx1 | | |
| B | yyy1 | yyy2 | |
| C | zzz1 | zzz2 | zzzn |

Figure 4

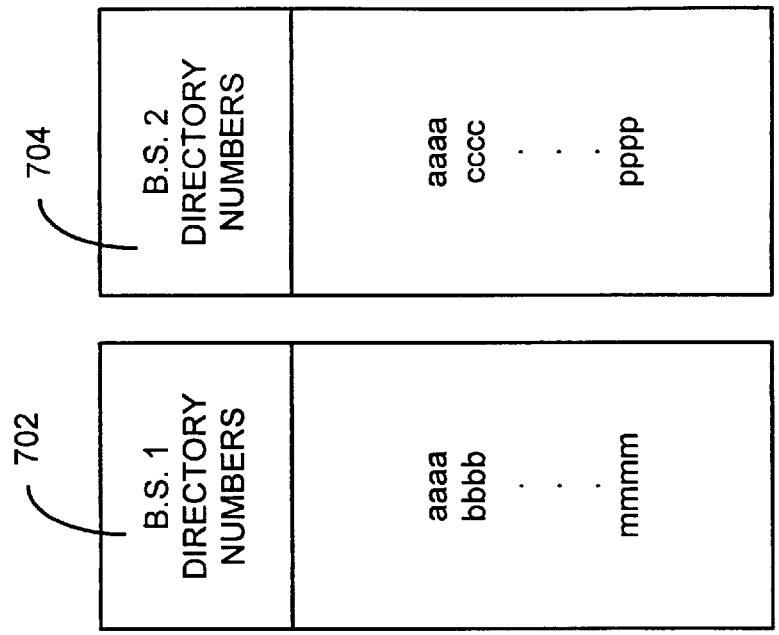

METHOD AND APPARATUS FOR ROUTING SUBSCRIBER ORIGINATED CALLS IN A FIXED WIRELESS ACCESS SYSTEM

CROSS REFERENCE TO RELATED APPLICATIONS

Cross reference is made to the following co-pending patent applications, each being assigned to the same assignee as the present invention and the teachings included herein by reference:

| SER. NO. | TITLE | FILED |
|---|---|---|
| 08/940,619 | METHOD AND APPARATUS FOR ROUTING CALLS TO A SUBSCRIBER IN AN FWA SYSTEM USING CALL FORWARD NO-ANSWER | 9/30/97 |
| 08/941,979 | METHOD AND APPARATUS FOR ROUTING CALLS TO A SUBSCRIBER IN AN FWA SYSTEM USING CALL FORWARD UNCONDITIONAL | 10/1/97 |
| 08/942,149 | METHOD AND APPARATUS FOR ROUTING CALLS TO A SUBSCRIBER IN AN FWA SYSTEM USING MULTIPLE ACCESS DIRECTORY NUMBERS | 10/1/97 |

BACKGROUND OF THE INVENTION

1. Field of the Invention

The present invention relates to wireless communications and more particularly to fixed wireless access communication systems.

2. Description of Related Art

Radio communication devices are often being used along with or in replacement of conventional wireline telephone systems. These radio communication devices provide many advantages over wireline systems. One advantage relates to the supporting infrastructure. Radio communication systems are simpler and less expensive to deploy in comparison to conventional wireline systems. Additionally, radio communication systems often have lower maintenance costs. Finally, radio communication systems are economically feasible in those sparse areas where low demand for communication services does not justify the cost of installing a wireline network.

In a fixed wireless access system (FWA), base stations form an interface between conventional wireline networks and wireless subscriber units. A subscriber unit is a user device which contains a radio transceiver for communicating with a base station. Subscriber units are often made to be compatible with ordinary wireline telephones. Typically, an ordinary telephone is plugged into the subscriber unit in place of a standard telephone wall jack such as an RJ-11 jack. The base stations within an FWA are geographically placed at intervals so as to be within range of select subscriber units. The service area of a base station is known as a cell or cell area. Subscribers to fixed wireless access systems typically are served by one cell in an FWA network (hereinafter, "primary cell").

Typically, a border cell subscriber unit will "lock onto" a cell's base station at power up after determining that the base stations control channel signal strength is stronger than that of other neighboring cell base stations. Once a subscriber unit responds to a control channel transmission, that cell becomes the primary cell. More specifically, the subscriber unit's directory number is assigned within an FWA controller to a single cell area (the primary cell) served by a specified base station. The operation and use of control channels as described is known to those skilled in the art. Thereafter, a FWA controller examines a subscriber list of directory numbers when it receives an indication that a wireless transceiver within its cell is trying to originate a call through the fixed wireless access system. The controller examines this subscriber list to determine that a proper subscriber is attempting to place a call. If the identification signals transmitted by the transceiver do not correspond with a directory number within this subscriber list, the call request is not processed. For calls which are being received by a switch for a specified FWA subscriber unit, the switch typically transmits a signal to a specified mode in an FWA controller to prompt it to issue page request signals to a base station to complete the call to the specified FWA controller unit.

This arrangement works well in the FWA system so long as a subscriber is not a border cell subscriber. A border cell subscriber is a subscriber of the FWA system services whose geographic placement is the fringe or border of a cell area. Border cell subscribers characteristically tend to receive weaker signals from the serving base station. On occasion, border cell subscribers cannot receive or initiate calls because random interference prevents the ability of base station of the primary cell and the border cell subscriber to complete a connection.

SUMMARY OF THE INVENTION

For border cell subscribers, the signal strength from the base station of a neighboring cell (secondary cell) is often stronger than the primary cell signal. This is specially true when random interference is present. Unfortunately, however, present FWA systems do not allow a border cell subscriber to create a communication link through a neighboring cell. A call can only be completed or originated through the primary cell. One reason is that a directory number for a subscriber is stored only within the subscriber list of the primary cell. The subscriber unit can only create communication links, therefore, through the corresponding base station.

In order to allow a subscriber to place a call through a base station other than the home base station, the subscriber's directory number is placed in the subscriber list for the neighboring cells. More specifically, the directory number is placed in the subscriber list of each cell which has a border that is geographically located close to the physical location of the border cell subscriber. This solution allows a subscriber unit to originate calls which would not be otherwise possible due to interference through the base stations of neighboring cells.

The controller examines the subscriber list for the cell through which a subscriber unit is attempting to place a call. The call will be completed even for a non-primary cell so long as the subscriber directory number is stored in the subscriber list for the given cell.

BRIEF DESCRIPTION OF THE DRAWINGS

FIG. 4 is a table which represents the contents of a store according to a preferred embodiment of the invention wherein circuit Id. numbers are mapped in relation to directory numbers;

FIG. 5 is a table which illustrates the mapping of circuit Id. numbers to mobile Id. numbers according to a preferred embodiment of the invention;

FIG. 6 is a table which illustrates the mapping of MINs to cell Id's according to a preferred embodiment of the invention; and FIG. 7 is a table which illustrates the relationship between directory numbers and base station subscriber lists according to a preferred embodiment of the invention.

DETAILED DESCRIPTION OF THE INVENTION

Figure 1:
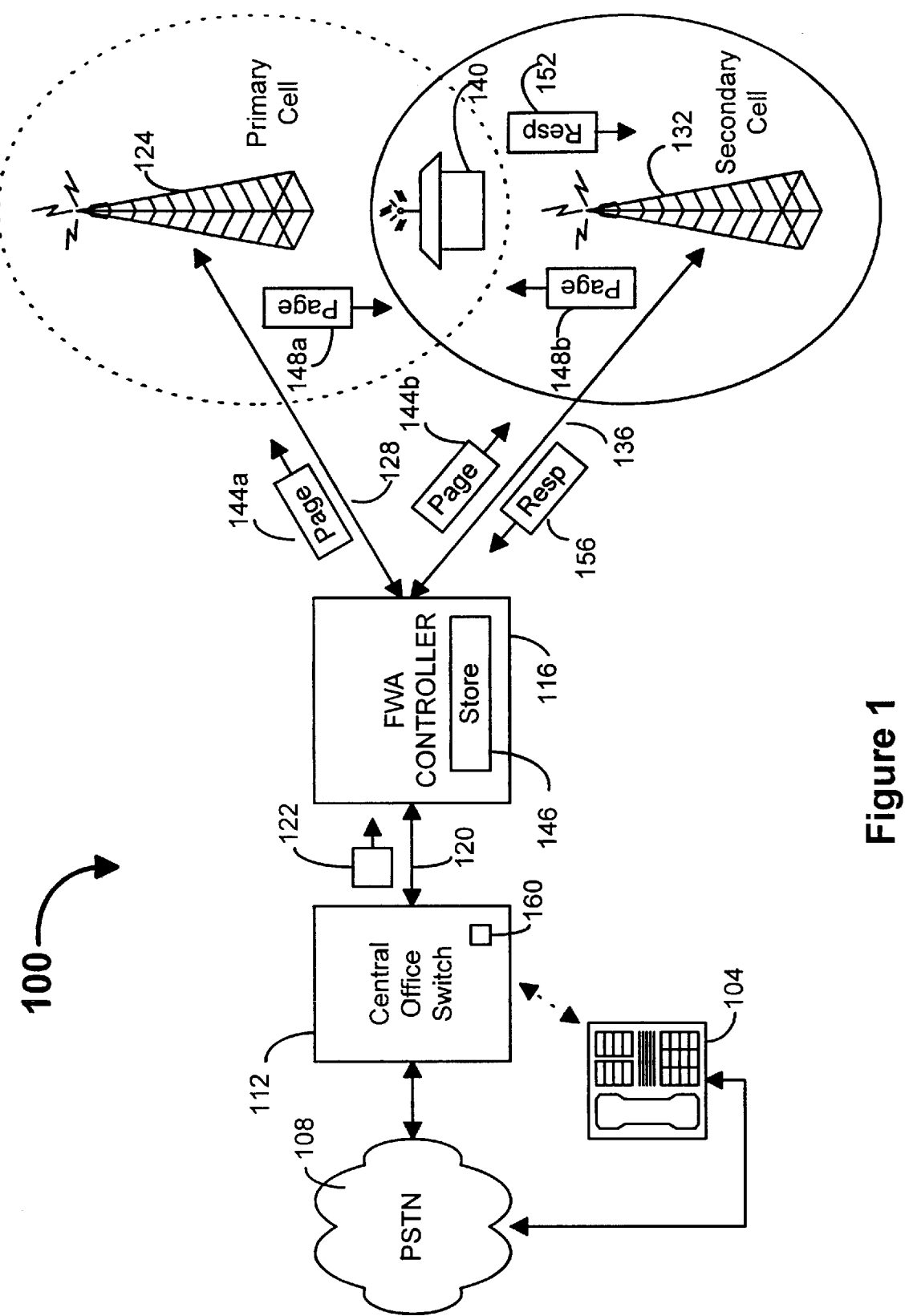
FIG. 1 is a functional block diagram which illustrates one embodiment of the invention wherein one fixed wireless access controller transmits page requests to a plurality of cells to reach a specified subscriber.

FIG. 1 is a functional block diagram which illustrates one embodiment of the invention wherein one fixed wireless access controller transmits page requests to a plurality of cells to reach a specified subscriber. Referring now to FIG. 1, a network 100 includes a calling party phone 104 which is connected to the public switched telephone network (PSTN) 108. For exemplary purposes herein, phone 104 is a common wireline telephone which originates and receives calls through PSTN 108. Calls originated by phone 104 are routed through PSTN 108 to reach a central office switch 112 for those wireless and wireline subscribers served by switch 112. While it is understood that switch 112 actually is formed as a part of PSTN 108, FIG. 1 shows PSTN 108 as separate from switch 112 for illustrative purposes.

Switch 112 is a central office switch which is used to route calls originated through the PSTN 108 and through wireless networks (not explicitly shown herein). Here, switch 112 is connected to a fixed wireless access (FWA) controller 116 by a line 120. Controller 116 is a device similar in function to a substantially simplified version of common mobile telephone switching offices (MTSOs). Controller 116 is connected to a plurality of cell base stations and is operable to complete calls to and from subscriber units, such as subscriber unit 140, through the plurality of cell base stations to which it is connected. Controller 116, therefore, serves to route a call originated externally to subscriber unit 140 and vice-versa. More specifically, controller 116 is connected to a base station (transceiver) 124 by line 128 and to base station (transceiver) 132 by line 136. Base stations 124 and 132 are operable to communicate with fixed wireless access subscriber units similar to subscriber unit 140.

A controller 116 is typically adapted to communicate with only one base station 124 or 132 to create a communication link with a specified subscriber unit 140. For example, controller 116 typically is adapted to send a page request to base station 124 whenever a communication link is to be created with subscriber unit 140. Controller 116 determines which subscriber unit is to be paged through a given base station by a signal 122 received from switch 112 as is known by those skilled in the art. Accordingly, it is switch 112 that determines what subscriber unit is to be paged and the base station which is to be used to page the subscriber unit. In the preferred embodiment, signal 122 is a specified voltage waveform whose presence on a specified node reflects that a call is being received for a specified subscriber unit. In an alternate embodiment, however, signal 122 contains an address location or code which represents that a call is being received for a specified subscriber unit. For calls originated by the subscriber unit 140, controller 116 includes a store 146 which maintains a list of the directory numbers or mobile identification numbers served by each particular base station. Under current implementations, a directory number of a subscriber unit 140 is listed in only one such list of directory numbers within store 146.

There is a problem, however, with storing a subscriber unit directory number in only one base station subscriber list. Namely, a subscriber originated call may be routed only through the one base station 124 which provides wireless service to the specified subscriber unit 140. Accordingly, if a communication link cannot be established between, for example, base station 124 and subscriber unit 140 because of interference, the call cannot be completed. For the purposes herein, the communication area created by base station 124 is considered as the primary cell for subscriber unit 140. Under current technology, only the primary cell can establish a communication link with subscriber unit 140.

The system 100 shown in FIG. 1 overcomes this deficiency because it allows a call to be connected to subscriber unit 140 even if a communication link cannot be successfully established between it and base station 124 through the primary cell. In general, system 100 overcomes this deficiency by allowing a call to be completed through alternate cells by alternate base stations. For example, a call may be completed through a secondary cell by base station 132.

In general, switch 112 is modified to include multiple circuit numbers for border cell subscribers. Any one of several subscriber features, namely, a call forward unconditional, call forward no-answer, or multiple access directory number may be used in a modified form to route calls to the subscriber unit. More specifically, a call forward no-answer subscriber feature may be used in conjunction with these multiple circuit numbers whenever a subscriber unit fails to respond to a call setup page request. This allows incoming calls to be routed through the secondary cell whenever a call is not answered. Similarly, a call forward unconditional subscriber feature may be used to route calls whenever the subscriber unit has previously locked onto a secondary cell. Alternatively, a multiple access directory number feature may be used to approximately simultaneously page the subscriber unit through multiple cell base stations.

For calls originated by the subscriber unit, the subscriber lists for the secondary cell base stations are modified to include the subscriber units directory number (or mobile ID number). Accordingly, an FWA controller is able to recognize a subscriber unit whenever it attempts to originate a call through a secondary cell base station.

For a subscriber unit to originate or receive a call through secondary base stations, it must have "locked onto" the secondary station prior to call routing for a given call. Primary base station (cell) selection occurs as a result of communications between the base stations and the subscriber unit over at least one control channel at power up. Base station 124 transmits over a control channel to subscriber unit 140 periodically as is known to those skilled in the art. Additionally, secondary base stations such as base station 132 also transmit over a control channel. Subscriber unit 140 can lock onto the primary cell or to a secondary cell. A problem with this, however, is that calls cannot be originated or received by the subscriber unit as long as it is locked onto a secondary cell. Subscriber unit 140 locks onto base station 124 or base station 132 according to select criteria. For example, if the select criteria is merely a determination of higher signal strength, then subscriber unit 140 will respond to the control channel transmission from the cell having the stronger signal strength. While different formulations may be used for selecting between cells, signal strength alone is used in one of the preferred embodiments of the invention.

In the preferred embodiment, subscriber unit 140 may receive or originate calls even though it is locked onto secondary cells. More specifically, subscriber unit 140 evaluates the signal strength of the control channel transmissions from base stations 124 and 132 and locks onto a cell by responding to the signal having a higher signal strength. Subscriber unit 140 responds by transmitting a response signal 152 to the base station which transmitted the stronger signal. In the example shown in FIG. 1, the secondary cell, namely the cell created by base station 132 has the stronger signal at a point in time after power up and after base station 124 was originally responded to and designated as the primary cell base station. Accordingly, subscriber unit 140 transmits a control channel response signal 152 to base station 132 in order to lock onto it even though base station 124 is and remains the primary cell base station.

Whenever a cell base station 132 receives a response signal 152, it transmits a response signal 156 to controller 116. Controller 116, in turn, communicates with switch 112 to indicate the same. Whenever switch 112 receives a signal from controller 116 which indicates that a secondary cell has been selected or locked onto by subscriber unit 140, logic circuitry 158 within switch 112 modifies the contents of store 160 so as to define a primary and an alternate circuit number for routing calls to subscriber unit 140. Logic circuitry 158 thereafter routes all calls received for subscriber unit 140 to the primary circuit number first and then, if no-answer, to the secondary circuit numbers if the "call forward no-answer" is selected for use in conjunction with the FWA network. In the preferred embodiment, logic circuitry 158 of switch 112 examines the contents of store 160 to determine the circuit number which will trigger controller 116 to page subscriber unit 140 through the secondary cell whenever the call forward no-answer feature is activated for the select circuit number. Similarly the additional circuit numbers are used for alternate routing if the call forward unconditionally subscriber feature is selected for the subscriber unit as a result, in part, of it having locked onto a secondary cell base station. Likewise, the alternate circuit numbers are used by the switch to generate multiple page requests if the multiple access directory number (MADN) subscriber feature is selected for the subscriber unit receiving a call.

In another embodiment of the invention, a call transfer feature is implemented in the fixed wireless access controller for transferring calls to a secondary directory number either within the same or within a different fixed wireless access controller whenever a call is received for a subscriber unit that is locked onto a secondary cell. Accordingly, the fixed wireless access controller includes circuitry storing the circuit number for the secondary cell and for routing a call to that circuit number whenever a secondary cell is locked onto by the subscriber unit. In the case where the circuit number for the secondary cell is within a separate fixed wireless access controller from the primary cell's controller, the fixed wireless access controller which serves the secondary cell is adapted to send a signal indicative of the fact that the subscriber unit has locked onto it so that the controller serving the primary cell is prompted to transfer incoming calls to the secondary controller.

In general, every subscriber served by a controller 116 has a circuit number which is used to cause the controller to generate a page request signal 144. Under current technology, each subscriber unit 140 has only one circuit number stored within controller 116 and switch 112. Under the inventive system of FIG. 1, however, a border cell subscriber, such as subscriber unit 140, has at least two circuit numbers within controller 116 and switch 112 which are reserved for triggering page request signals 144a and/or 144b to page subscriber unit 140.

Continuing to refer to FIG. 1, controller 116 includes a store 146. Store 146 is for maintaining the list of subscriber units served by a particular base station within a particular cell. Accordingly, if the primary cell for subscriber unit 140 is a cell served by base station 124, then controller 116 would include the directory number of subscriber unit 140 within the list of subscribers for base station 124. Similarly, controller 116 includes a list of directory numbers served by base station 132. As stated before, current systems provide for a subscriber units directory number to be listed in only one list of subscriber units served by a given base station. In the network 100, however, the directory number of subscriber unit 140 is stored within the subscriber lists of store 146 for base stations 124 and 132. As a result, subscriber unit 140 is able to register its presence and originate a call either with base stations 124 or 132.

As discussed above, in current systems, a subscriber unit 140 has only one circuit number assigned to it in the network 100. In the inventive system herein, network 100 includes at least two circuit numbers for border cell subscriber units such as subscriber unit 140. Central office switch 112 includes a store 160 which is used to store a list of subscriber unit directory number as well as a corresponding circuit number for each directory number stored therein. Accordingly, if a call is received for a directory number for whom the call forward no-answer, call forward unconditional or MADN subscriber feature is presently selected, then that number is stored along with at least one alternate circuit number in a specified list within store 160. The central office switch 112 examines the list within store 160 whenever a call is being received for a given directory number to determine the circuit number of controller 116 for the purposes of routing a call through a base station to the select subscriber unit.

In operation, central office switch 112 is operable to route calls to subscriber unit 140 through either the primary cell base station 124 or secondary cell base station 132. If, by way of example, subscriber unit 140 attempts to "lock onto" the secondary cell, controller 116 will only establish communications with subscriber unit 140 if its directory number is stored within a subscriber list for the secondary cells base station 132. Once subscriber unit 140 has locked onto the secondary cell, calls are routed through it according to the subscriber feature presently activated for the subscriber unit 140 within switch 112. If a call forward no answer subscriber feature is activated, switch 112 initially selects the circuit number which causes controller 116 to transmit page request signal 144a to base station 124 and then transmits signal 122 thereto. Base station 124, in turn, transmits a page 148a to establish a communication link with subscriber unit 140. If subscriber unit 140 does not respond with a response signal 152 within a specified period of time, switch 112 transmits signal 122 to the first alternate circuit number. In the example herein, controller 116 then transmits page request signal 148b subscriber unit 140 then responds with response signal 152.

Similarly, if a MADN subscriber feature is selected, switch 112 sends signal 122 to the primary and secondary circuit numbers of controller 116. Controller 116 responds by sending page request signals 144a and 144b to base stations 124 and 132, respectively. Base stations 124 and 132 respond by transmitting page signals 148a and 148b to subscriber unit 140. Because subscriber unit 140 is locked onto the secondary cell, it transmits response signal 152 to base station 132.

On the other hand, if a call forward unconditional subscriber feature is presently activated for subscriber unit 140, switch 112 examines the contents of store 160 to insert an alternate circuit number for cell routing whenever switch 112 receives a signal from controller 116 indicating that subscriber unit 140 has locked onto the secondary cell. Accordingly, whenever a call is received for subscriber unit 140, switch 112 sends signal 122 to the alternate circuit number for the secondary cell. Controller 116 responds by transmitting page request signal 144b to base station 132. Base station 132 transmits page 148b to subscriber unit 148b to set up the incoming call.

While some subscriber units 140 respond to a paging signal or other signal transmitted over a control channel having the highest signal strength for the purpose of locking onto a cell base station, other subscriber units 140 may also evaluate parameters reflective of signal quality. For example, a bit error rate or a frame error rate may be used to determine which base station should be selected for establishing a communication link to complete the call connection. As may be seen therefore, a communication link may be established through a cell other than the primary cell if interference is present. The use of a system which allows the subscriber unit to establish communication links through other cells (secondary cells) allows a call to be completed when interference prevents the completion of a call connection in the primary cell.

Figure 2:
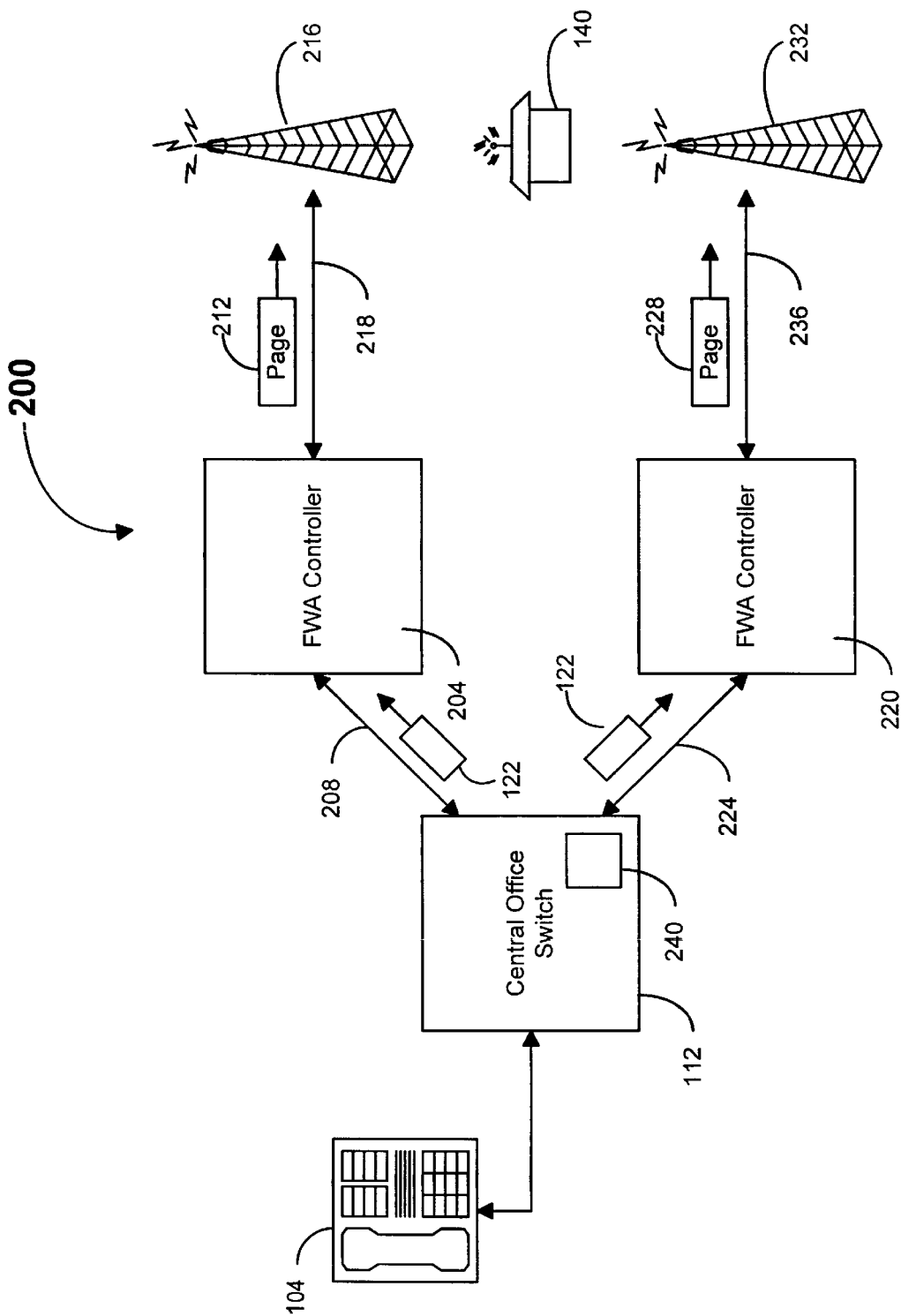
FIG. 2 is a functional block diagram which illustrates an embodiment of the invention wherein two fixed wireless access controllers transmit page requests to a plurality of cells to reach a specified subscriber.

FIG. 2 is a functional block diagram which illustrates an embodiment of the invention wherein two fixed wireless access controllers transmit page requests to a plurality of cells to reach a specified subscriber. Referring now to FIG. 2, a network 200 includes a central office switch 112 which is connected to controller 204 by line 208. The network 200 of FIG. 2 also includes a second controller 212. Controller 212 is connected to switch 112 by line 216.

As with the network 100 of FIG. 1, network 200 routes calls to subscriber unit 140 through one of a plurality of base stations according to the base station or cell to which subscriber unit 140 has selected or "locked onto" and according whether the call forward no-answer, call forward unconditional, or MADN subscriber feature is being used. More specifically, calls are routed from switch 112 to the base station which has received control channel response signals 152 (not shown here in FIG. 2) upon power and which has been designated as the primary cell base station. As with network 100, switch 112 of network 200 uses a call forward no-answer feature to route calls to subscriber unit 140 according to the selected subscriber feature. Structurally, however, a difference between network 100 and network 200 of FIG. 2 is that the primary and secondary cells shown herein are served by different controllers. In the example of FIG. 2, FWA controller 204 serves the primary cell while FWA controller 212 serves the secondary cell. Regarding the central office switch 112, however, the difference is not significant. The reason is that the circuit numbers which correspond to subscriber unit 140 cause the switch to properly route a signal 122 either to controller 212 or 204. More specifically, if, as with the preferred embodiment, signal 122 is formed of a voltage signal which is applied at a specified node, the circuit number provides the address or location of the node to which signal 122 is applied. Because each controller 212 or 204 has a unique node address or circuit number, the proper controller will page subscriber unit 140 through the proper base station according to the select node that received 122.

Another difference between network 200 of FIG. 2 and network 100 of FIG. 1, however, is that the directory number of subscriber unit 140 is physically stored in subscriber lists which are not colocated in the same storage area as with the system of FIG. 1. More specifically, the directory number of subscriber unit 140 is stored in differing subscriber lists within store 146. Here, however, the directory number of subscriber unit 140 is stored in a subscriber list stored within store 220 of controller 212 and store 224 of controller 204, respectively. Accordingly, if subscriber unit 140 attempts to originate a call through the primary cell that is served by controller 204, the call will be allowed because the subscriber unit directory number is stored within store 204. Similarly, subscriber unit 140 may originate calls through the secondary cell because its directory number is stored in store 220 of controller 212. Similar to the network of FIG. 1, however, the network of FIG. 2 also utilizes any one of the call forward no-answer, call forward unconditional or MADN subscriber feature to route calls to secondary base stations if the subscriber unit fails to respond to a call set up page from the primary base station.

Figure 3:
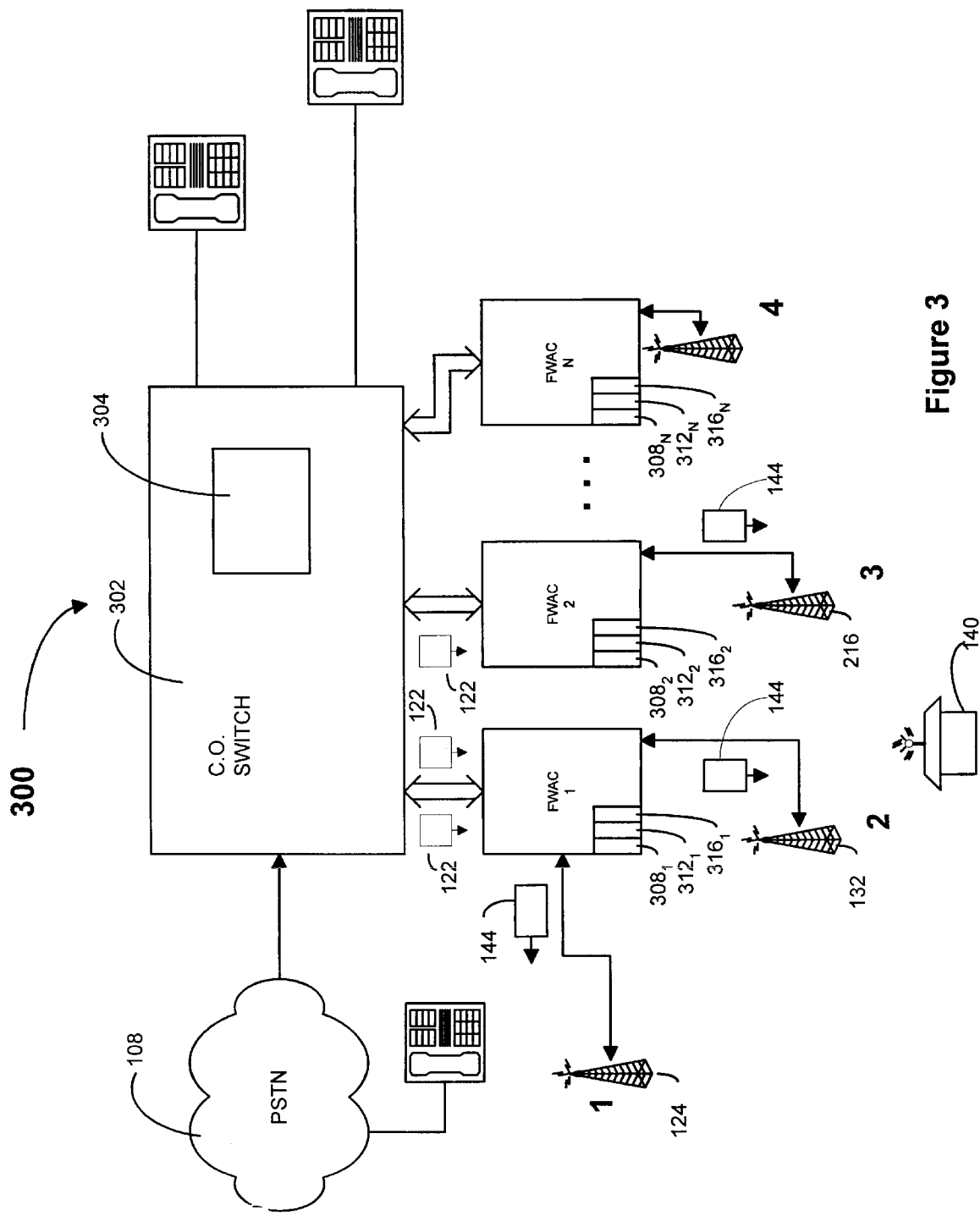
FIG. 3 is a functional block diagram of a fixed wireless access network according to a preferred embodiment of the invention.

FIG. 3 is a functional block diagram of a fixed wireless access network according to a preferred embodiment of the invention. Referring now to FIG. 3, a network 300 includes switch 302 that is connected to a plurality of fixed wireless access controllers. The controllers are listed as being controllers 1, 2 . . . N (hereinafter, controller N). Each controller N is similar in structure to controllers 116, 204 and 212 of FIGS. 1 and 2. Switch 302 includes a store 304 which is for storing a circuit Id. table which defines the mapping of directory numbers to circuit Id. numbers for use by the aforementioned call forward no-answer, call forward unconditional or MADN subscriber (CFNA) features. Each controller N includes a plurality of stores that define the mapping of circuit numbers, mobile Id. numbers, cell numbers and directory numbers. More specifically, each controller N includes a store $308_N$, $312_N$ and $316_N$. Store $308_N$ defines the mapping of circuit Id. numbers to mobile Id. numbers (MINs). Store $312_N$ defines the mapping of MINs to cell Id. numbers. Store $316_N$ defines the mapping of cells to directory numbers.

In operation, network 300 of FIG. 3 is operable to cause a plurality of base stations 1, 2, 3 and/or 4 to transmit page requests to a border cell subscriber 140 to connect a call which is being received. More specifically, switch 302 examines the contents of store 304 whenever it receives a call from the PSTN 108 or from phone 104. Switch 302 determines, from examining the contents of store 304, which circuit Id. relates or maps to the directory number of the called party. If the called party subscriber unit fails to respond to the primary cell base station's call setup page requests (for call forward no-answer), the CFNA feature is activated by the switch 302. Switch 302 then transmits signal 122 (of FIGS. 1 and 2) to the corresponding controller for the subsequent circuit number stored within store 304. For exemplary purposes herein, switch 302 transmits signal 122 initially to controller 1 and then to controller 2. Similarly, if the call forward unconditional subscriber feature is selected, switch 302 transmits signal 122 directly to controller 2. If MADN is selected, switch 302 transmits signal 122 to both controllers 1 and 2. In the preferred embodiment, the circuit Id.'s serve as a controller address for signal 122. Accordingly, as discussed before, the specific address of the circuit number causes switch 302 to impress a voltage level at a specified node within the specified controller.

FIG. 4 is a table which represents the contents of a store according to a preferred embodiment of the invention wherein circuit Id. numbers are mapped in relation to directory numbers. Referring now to FIG. 4, it may be seen that each directory number has a unique corresponding circuit Id. number. Whenever switch 302 of FIG. 3 receives a call for subscriber unit 140, signal 122 is transmitted to a specified node controller 1. Controller 1 examines the corresponding circuit Id. number in store $308_1$. FIG. 5 is a table that illustrates the mapping of circuit Id. numbers to mobile Id. numbers according to a preferred embodiment of the invention. Referring now to FIG. 5, each circuit Id. includes one corresponding MIN. FIG. 6 is a table that illustrates the mapping of MINs to cell Id's. Referring now to FIG. 6, each MIN has one cell Id. listed. For example, MIN "qrz1" is associated with cell 1.

In operation, when controller 1 of FIG. 3 receives signal 122 from switch 302, it examines the contents of store $308_1$ (as shown in FIG. 5) and uses the circuit Id. number of signal 122 to determine the MIN of the subscriber unit 140 which is receiving a call and which is to be paged. Controller 1 then examines the contents of store $312_1$ (as shown in FIG. 6) to determine which cell Id. corresponds with the MIN for the subscriber unit. After determining the cell Id., controller 1 sends a page request signal 144 to the corresponding base station (here, base station 1). Base station 1 then transmits the actual page to the specified subscriber unit.

FIG. 7 is a table that illustrates the relationship between directory numbers and base station subscriber lists according to a preferred embodiment of the invention. Referring now to FIG. 7, it may be seen that directory number "aaaa" is stored within each subscriber list 702 and 704. The other directory numbers are stored in either subscriber list, 702 or 704. In this example, directory number "aaaa" is that of a border cell subscriber 140. In operation, an FWA controller examines the subscriber list for a given cell area or base station whenever a transceiver attempts to place a cell through the given base station. Accordingly, whenever border cell subscriber unit 140 attempts to originate a call either through base station 702 or 704, the FWA controller which includes these subscriber lists 702 and 704 will complete the call routing. While not explicitly shown, it is understood that other subscriber lists stored in other controllers may also include the directory number "aaaa" for border cell subscriber 140. Similarly, subscriber list 702 could be stored in a FWA controller other than the one in which subscriber list 704 is stored.

As may be seen, the present invention allows subscribers of fixed wireless access services to receive and to place calls through secondary cells whenever interference is present in the primary cell. In some cases, this invention makes calls possible which would otherwise not be completed. The present invention is believed to be especially effective when configured and employed as described herein. Those skilled in the art, however, will readily recognize that numerous variations and substitutions may be made in the invention and its use and configuration to achieve substantially the same results as achieved by the embodiments and, in particular, the preferred embodiments described herein. Each variation is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A fixed wireless access system for routing calls originated by a fixed wireless subscriber physically located near the edge of the coverage area for at least two base stations, said subscriber having a directory number, the system comprising, in combination:

a fixed wireless access controller coupled to a plurality of base stations, the fixed wireless access controller including a data store with a table therein linking the directory number of the subscriber to a primary base station and at least one secondary base station, each primary and secondary base station being located such that the coverage area thereof includes the location of the fixed wireless subscriber, said fixed wireless access controller completing a connection to the party being called by the fixed wireless subscriber whenever the call originated from the fixed wireless subscriber is detected at any said linked primary or secondary base station thereby permitting completion of the call even if interference would prevent connection via the primary base station.

2. The fixed wireless access system of claim 1 wherein said fixed wireless access controller only permits connection between fixed wireless subscribers and base stations that are specifically linked in said table.

* * * * *